Oct. 1, 1968
B. L. JONES ET AL
3,403,830
COMBINATION WASTE AND SOILED CLOTHES
RECEPTACLE FOR AN AUTOMOBILE
Filed Aug. 5, 1966
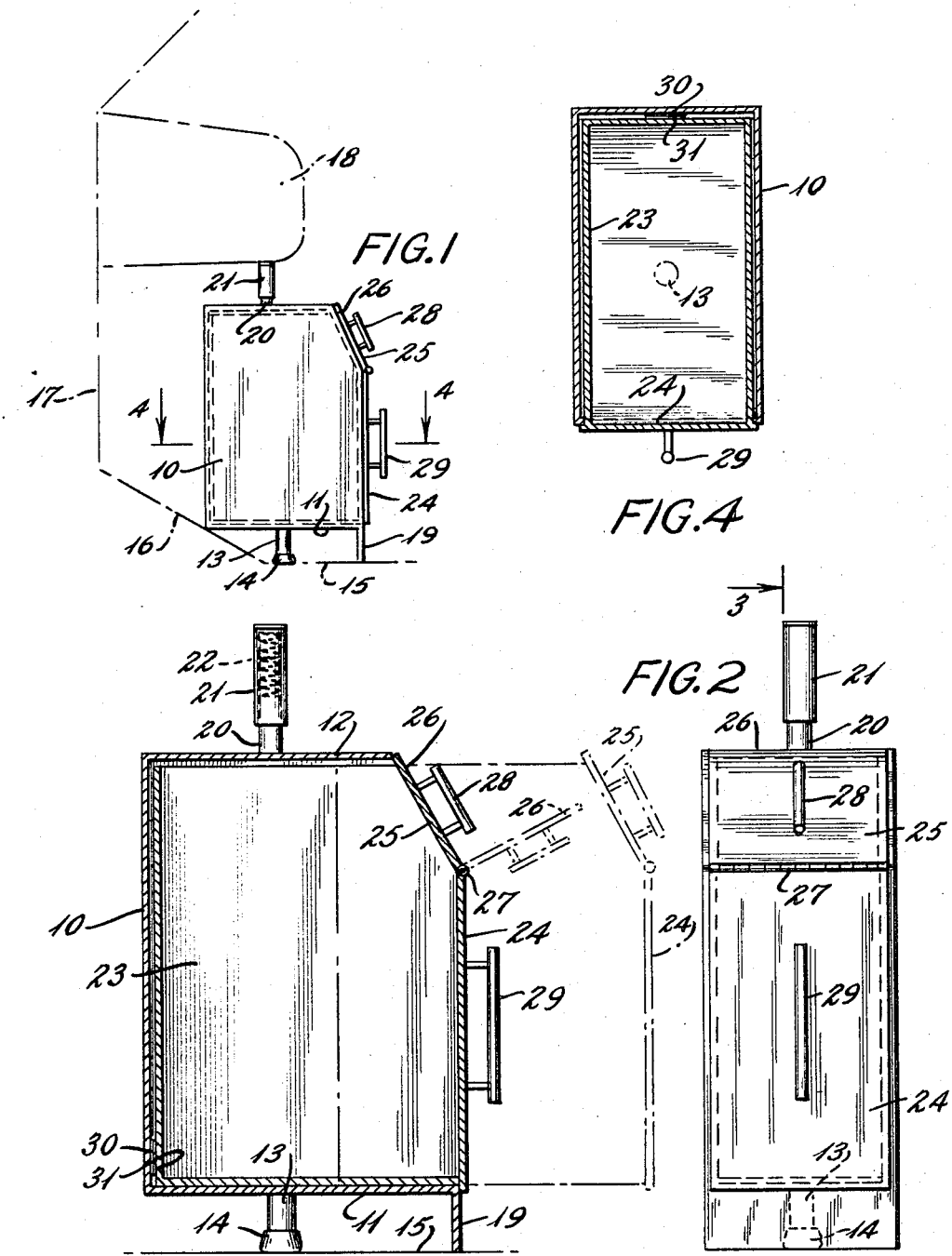
INVENTORS
BERLIN L. JONES &
JANE A. JONES
BY
ATTORNEYS United States Patent Office 3,403,830
Patented Oct. 1, 1968

3,403,830
COMBINATION WASTE AND SOILED CLOTHES RECEPTACLE FOR AN AUTOMOBILE
Berlin L. Jones and Jane A. Jones, both of P.O. Box 142, Philippi, W.Va. 26416
Filed Aug. 5, 1966, Ser. No. 570,513
6 Claims. (Cl. 224—29)

ABSTRACT OF THE DISCLOSURE

The present invention is a combination waste and soiled clothes receptacle for application beneath the dash of an automobile and it comprises an open front housing and a receptacle, the housing being provided with means for quickly securing it in fixed position beneath the dash and the receptacle being nestable within the housing and having an angular opening affording access thereinto, and with a spring actuated closure for such opening. Also the receptacle is provided with grip means, or, in other words, a handle on its front portion, by which it may be readily inserted and removed, and with means by which said open front housing may be quickly secured in fixed relation in an automobile.

---

This invention relates to a receptacle which can be removably mounted beneath the dash of an automobile and used for containing trash and soiled clothes. Heretofore litter bags have been used in automobiles, but these have been subject to numerous criticisms, including that they were relatively small, unstable, their contents easily spilled and required the picking up of the spilled objects, and frequently were not waterproof or durable.

It is an object of the invention to provide a combination waste and soiled clothes receptacle of light weight, preferably made of plastic, of a size to contain waste, soiled clothes, and other articles of a relatively large family, including several small children, which device is of simple inexpensive and durable construction, which can be readily fitted between the floor and dashpanel and solidly and permanently installed in an automobile, regardless of manufacture and with a readily removable drawer, as well as a device as described which can be installed without the use of special tools or equipment or the drilling of holes, or the use of special screws or other fasteners to secure the same in place.

Other objects and advantages of the invention will be apparent from the following description considered in connection with the accompanying drawing, wherein FIG. 1 is a side elevation illustrating one embodiment of the invention mounted between the dash and floor of an automobile;

FIG. 2, a front elevation of the invention;

FIG. 3, a side elevation with broken lines illustrating how the pivotal door can swing open and how the removable receptacle can be readily withdrawn from its housing for emptying; and FIG. 4, a horizontal section on the line 4—4 of FIG. 1.

Briefly stated, the invention is a device for installation between the dash and the floor of an automobile and includes an open-front housing with adjustable supports at the top and bottom by which it can be secured solidly in fixed position including a stabilizing support at its lower front end. Within the solidly mounted housing is disposed a removable receptacle in the form of a drawer with an inclined pivoted door at its upper front end with a handle by which it can be opened, and with a spring hinge retaining it normally closed. The front of the removable drawer or receptacle is provided with a handle which can be gripped and the drawer removed with its contents for emptying.

With continued reference to the drawings, the device of the present invention comprises a housing 10 of generally rectangular shape with a bottom wall 11 and a shorter top wall 12. The housing 10 has one or more fixed support means 13 with rubber or other nonfriction tip attached and adapted to rest upon the horizontal portion of the floor 15 of an automobile near its juncture with the inclined portion of the floor which joins the fire wall and above the upper portion of which is located the dash 18. At the lower front edge of the bottom 11 of the housing is a stabilized support 19 which acts in conjunction with supporting means 13 to provide a solid foundation for the housing 10. In order to secure the housing in fixed relation, one or more additional supports are provided on the top of the housing for engagement with the dash 18 and such additional supports may comprise telescopic post members 20 and 21 between which is disposed a spring or other resilient means 22 which tends to urge such telescopic posts apart resulting in the lengthening of the posts and when engaged with the dash 18 retains the housing 10 in place under the tension of the resilient means. It will be understood that one or more of these supports may be employed as preferred and that installation is relatively simple and require no special tools, fixtures or other equipment.

Within the housing 10 is mounted an open top drawer or receptacle 23 with a shorter front wall 24, an inclined upper front edge, and a door or closure 26 attached by a spring hinge 27 to the upper edge of the front wall 24. The door normally will be disposed in closed position but is adapted to be swung forwardly to the broken line position of FIG. 3 to afford access to the receptacle 23, and in order readily and easily to open the door 26 a handle 28 is provided and in order to remove the drawer or receptacle a handle 29 is attached to the front wall 24 of the receptacle 23. It will be understood that the handles 28 and 29 project forwardly for ready access to occupants of the front seat of the vehicle, but these handles may be streamlined and caused to project a minimum amount to avoid injury hazard to the occupants of the vehicle. If desired the housing and receptacle may have a metal plate 30 and a magnet 31 to maintain the receptacle in the housing against accidental removal.

It will be apparent from the foregoing that a simple practical inexpensive combination waste and soiled clothing receptacle is provided of large capacity, which can be readily manufactured, preferably from lightweight plastic or other available material, and can be installed without difficulty in a small or large automobile without the use of tools, fasteners or other special equipment, and the collection receptacle easily may be inserted for collection and convenient emptying. Also by slight pressure upon the door it can be opened to allow for the introduction of objects and on account of its spring hinge will retain the contents against spillage.

It will be obvious that various changes may be made in the invention without departing from the spirit and scope thereof, and therefore the invention is not limited to what is illustrated in the drawing and described in the specifications but only as set forth in the accompanying claims.

What is claimed:
1. A combination waste and soiled clothes receptacle for an automobile comprising an open front housing, rigid supporting means attached to the lower portion of said housing for engaging the floor of an automobile, extendable and retractable support means attached to the top of said housing for engagement with the dash of an automobile, a receptacle contained in said housing and removable and replaceable through said open front, said receptacle having a receiving opening at its upper front portion, a spring actuated closure for said receiving opening, and a handle on the front of said receptacle by which it may be removed and replaced, whereby said combination can be easily installed in an automobile without special tools and fasteners.

2. The structure of claim 1 in which spring means is provided in connection with said extendable and retractable support means.

3. The structure of claim 1 in which said receiving opening in said receptacle is inclined for easier accessibility thereto.

4. The structure of claim 1 having readily releasable means for maintaining said receptacle in said housing.

5. The structure of claim 1 in which said support means attached to the bottom of said housing includes frictional grip means.

6. A combination waste and soiled clothes receptacle for an automobile comprising an open front housing of a size to be disposed and secured in fixed relation beneath the dash of an automobile and a removable receptacle nested within said open front housing and applicable and removable through said open front, said receptacle having an angular receiving opening at its upper front portion for easy access to said receptacle and a spring actuated closure for said angular receiving opening, grip means on the front portion of said receptacle by which it may be inserted and removed, means whereby said open front housing may be quickly secured in generally fixed relation beneath the dash of an automobile, said last mentioned means including support means attached to the bottom of said housing and engageable with the floor and a support means attached to the top of said housing and engageable with the dash of an automobile in which the housing is located, at least a portion of one of said support means being readily adjustable to secure said housing in place.

References Cited

UNITED STATES PATENTS

| | | | |
|---|---|---|---|
| 292,926 | 2/1884 | Linsley | 312—303 X |
| 871,102 | 11/1907 | Blaine | 312—303 X |
| 1,917,363 | 7/1933 | Fohn | 312—303 X |
| 2,091,598 | 8/1937 | Tjaarda | 296—37 X |
| 2,966,290 | 12/1960 | De Angelis | 224—29 |
| 3,265,261 | 8/1966 | Kenrick | 224—29 |
| 3,291,353 | 12/1966 | Sobczak. | |

BENJAMIN HERSH, *Primary Examiner.*

J. A. PEKAR, *Assistant Examiner.*